United States Patent [19]

Nakamura et al.

[11] Patent Number: 5,344,861

[45] Date of Patent: Sep. 6, 1994

[54] CHLOROSULFONATED POLYETHYLENE POLYMER COMPOSITION

[75] Inventors: Hideyoshi Nakamura; Katsumi Sando, both of Yamaguchi, Japan

[73] Assignee: Tosoh Corporation, Yamaguchi, Japan

[21] Appl. No.: 41,894

[22] Filed: Apr. 2, 1993

Related U.S. Application Data

[63] Continuation of Ser. No. 568,155, Aug. 16, 1990, abandoned.

[30] Foreign Application Priority Data

Aug. 16, 1989 [JP] Japan ................................. 1-210050

[51] Int. Cl.$^5$ ............................................. C08K 5/17
[52] U.S. Cl. ..................................... 524/254; 524/394; 524/396; 524/398; 524/399; 524/400; 524/430; 524/433
[58] Field of Search ............... 524/254, 394, 396, 398, 524/399, 400, 430, 433

[56] References Cited

PUBLICATIONS

Database WPIL, No. 88-088479, Derwent Abstract of JP-A-63039946.
Chemical Abstracts, vol. 72, No. 12, Mar. 23, 1970, p. 49, Abstract No. 56456g.
Chemical Abstracts, vol. 110, No. 24, Jun. 12, 1989, p. 90, Abstract No. 214563z.

*Primary Examiner*—Joseph L. Schofer
*Assistant Examiner*—Peter D. Mulcahy
*Attorney, Agent, or Firm*—Sughrue, Mion, Zinn, Macpeak & Seas

[57] ABSTRACT

A chlorosulfonated polyethylene polymer composition is disclosed, comprising a chlorosulfonated polyethylene polymer having incorporated therein (a) from 0.1 to 20 parts by weight of a metal salt of an organic acid, (b) from 0.1 to 10 parts by weight of a phenylamine and/or a phenylenediamine, (c) from 1 to 30 parts by weight of an acid acceptor, and (d) from 0.1 to 10 parts by weight of a vulcanizing agent, per 100 parts by weight of the chlorosulfonated polyethylene polymer. The composition provides a vulcanized product excellent in ozone resistance as well as mechanical strength.

5 Claims, No Drawings

CHLOROSULFONATED POLYETHYLENE POLYMER COMPOSITION

This is a continuation of application No. 07/568,155 filed Aug. 16, 1990, now abandoned.

FIELD OF THE INVENTION

This invention relates to a composition for vulcanizing a chlorosulfonated polyethylene polymer. More particularly, it relates to a chlorosulfonated polyethylene polymer composition having improved ozone resistance.

BACKGROUND OF THE INVENTION

Chlorosulfonated polyethylene polymers are special elastomers excellent in ozone resistance, weather resistance, heat resistance, oil resistance, and chemical resistance, and these excellent characteristics have been taken advantage of in extruded articles, such as wire coatings and hoses, or calendared articles, such as coated fabric.

In recent years, higher performance properties have been required of rubber parts, particularly automobile parts, to stand use under very severe conditions. Chlorosulfonated polyethylene polymers have also been demanded to have improved performance, particularly ozone resistance for use, e.g., as coating materials of various automotive hoses.

Known methods for improving ozone resistance include compounding of a vegetable oil having an unsaturated bond. However, a vegetable oil is extracted on contact with fuel oil or grease to reduce its effect. JP-A-63-57654 (the term "JPA" as used herein means an "unexamined published Japanese patent application") proposes a chlorosulfonated polyethylene polymer composition free from permanent set and excellent in ozone resistance, comprising a chlorosulfonated polyethylene polymer having incorporated therein an amine maleimide compound, nickel dithiocarbamate, a metal oxide, and a polysulfide compound, but the effect of improving ozone resistance is still insufficient.

SUMMARY OF THE INVENTION

An object of this invention is to provide a chlorosulfonated polyethylene polymer composition which provides a vulcanized product exhibiting not only excellent mechanical properties as a rubber such as strength under severe condition of use in, for example, automobiles but also excellent ozone resistance.

The inventors have conducted extensive investigations to obtain a vulcanized product excellent in ozone resistance and, as a result, found that the above object of this invention is accomplished by a chlorosulfonated polyethylene polymer composition comprising a chlorosulfonated polyethylene polymer, (a) from 0.1 to 20 parts by weight of a metal salt of an organic acid, (b) from 0.1 to 10 parts by weight of a phenylamine, phenylenediamine, or phenylamine and phenylenediamine, (c) from 1 to 30 parts by weight of an acid acceptor, and (d) from 0.1 to 10 parts by weight of a vulcanizing agent, per 100 parts by weight of the chlorosulfonated polyethylene polymer.

DETAILED DESCRIPTION OF THE INVENTION

The chlorosulfonated polyethylene polymer which can be used in the present invention is a polymer obtained by chlorinating and chlorosulfonating a polyethylene polymer with chlorine and sulfur dioxide, or chlorine and sulfuryl chloride, or sulfuryl chloride alone so as to contain prescribed amounts of sulfur in the form of $-SO_2Cl$ and chlorine. It usually has a sulfur content of from 0.2 to 3.0% by weight and a chlorine content of from 10 to 50% by weight.

The starting polyethylene polymer includes polyethylene and ethylene-based copolymers, e.g., an ethylenebutene-1 copolymer, an ethylene-propylene copolymer, and an ethylene-vinyl acetate copolymer.

The metal salt of an organic acid as component (a) is a metal salt of a carboxylic acid type organic acid including a saturated or unsaturated fatty acid having 6 or more carbon atoms, a chain organic acid having less than 6 carbon atoms, an aromatic organic acid, and a cyclic organic acid.

Specific examples of suitable saturated fatty acids having 6 or more carbon atoms are caproic acid, enanthic acid, caprylic acid, pelargonic acid, capric acid, undecanoic acid, lauric acid, myristic acid, palmitic acid, margaric acid, stearic acid, arachic acid, behenic acid, lignoceric acid, cerotic acid, montanic acid, and melissic acid.

Specific examples of suitable unsaturated fatty acids having 6 or more carbon atoms include monobasic acid type fatty acids, e.g., hexenoic acid, heptenoic acid, octenoic acid, nonenoic acid, decylenic acid, palmitoleic acid, oleic acid, ricinoleic acid, petroselinic acid, vaccenic acid, linolic acid, linoleic acid, eleostearic acid, licanic acid, parinaric acid, tariric acid, gadoleic acid, arachidic acid, cetoleic acid, erucic acid, and selacholeic acid; and dibasic and tribasic acid type fatty acids thereof.

Specific examples of suitable chain organic acids having less than 6 carbon atoms include monobasic acid type chain organic acids, e.g., formic acid, acetic acid, propionic acid, butyric acid, valerianic acid, oxalic acid, malonic acid, succinic acid, glutamic acid, trimesic acid, vinyl acid, crotonic acid, fumaric acid, maleic acid, glycolic acid, lactic acid, methoxyacetic acid, and acrylic acid; and dibasic and tribasic acid type chain organic acids thereof.

Specific examples of suitable aromatic organic acids are benzoic acid, hydrocinnamic acid, phenylbutyric acid, phenylvalerianic acid, phenylcaproic acid, phenylenanthic acid, phenylcaprylic acid, phenylpelargonic acid, phenylcapric acid, benzoylacrylic acid, phenylcyclohexylic acid, phenylbenzoic acid, phenylundecanoic acid, naphthoic acid, phthalic acid, hemimellitic acid, toluylic acid, salicylic acid, and acetylsalicylic acid.

Specific examples of suitable cyclic organic acids are cyclopropanecarboxylic acid, cyclobutanecarboxylic acid, cyclopentanecarboxylic acid, cyclohexanecarboxylic acid, cycloheptanecarboxylic acid, heptylcyclopentylacetic acid, octylcyclopentylacetic acid, nonylcyclopentylacetic acid, undecylcyclopentylacetic acid, pentylcyclohexylacetic acid, heptylcyclohexylacetic acid, nonylcyclohexylacetic acid, undecylcyclohexylacetic acid, octylcyclopentylbutyric acid, undecylcyclopentylbutyric acid, pentacyclopentylbutyric acid, hexacyclopentylbutyric acid, decylcyclohexylpropionic acid, dodecylcyclohexylpropionic acid, tetradecylcyclohexylpropionic acid, cyclohexylpropionic acid, cyclohexylbutyric acid, cyclohexylcaproic acid, cyclohexylcapric acid, cyclohexyllauric acid, naphthenic acid, camphonanic acid, aleprolic acid, aleprylic acid, hydnocarpic acid, methyleneoctadecenoic acid, dimer acid, and resin acid.

Metals constituting the metal salts of these organic acids include lithium of the second period (of the periodic table); sodium, magnesium, and aluminum of the third period, potassium, calcium, titanium, vanadium, chromium, manganese, iron, cobalt, nickel, copper, zinc, and germanium of the fourth period; strontium, cadmium, and tin of the fifth period; and barium and lead of the sixth period.

The metal salt of an organic acid as herein referred to is a compound formed by the above-described organic acid and metal. The organic acid metal salt is used either individually or in combination of two or more thereof in a total amount of from 0.1 to 20 parts by weight, preferably from 0.3 to 10 parts by weight, per 100 parts by weight of the chlorosulfonated polyethylene polymer. If the amount of the organic acid metal salt is less than 0.1 part by weight, the effect of improving ozone resistance is small. If it exceeds 20 parts by weight, chemical and physical properties of the chlorosulfonated polyethylene polymer are deteriorated.

The phenylamine which can be used as component (b) includes phenyl-α-naphthylamine, phenyl-β-naphthylamine, aldol-α-naphthylamine, p-isopropoxydiphenylamine, p-(ptoluenesulfonylamido)diphenylamine, bis(phenylisopropylidene)-4,4'-diphenylamine, N,N'-diphenylethylenediamine, N,N'-diphenylpropylenediamine, a reaction product of diphenylamine and acetone, a reaction product of diphenylamine, aniline, and acetone, a reaction product of diphenylamine and diisobutylene, an alkylated diphenylamine (e.g., octylated diphenylamine and nonylated diphenylamine), and styrenated diphenylamine.

The phenylenediamine which can also be used as component (b) includes N,N'-diphenyl-p-phenylenediamine, Nisopropyl-N'-phenyl-p-phenylenediamine, N,N'-dinaphthyl-pphenylenediamine, N-cyclohexyl-N'-phenyl-p-phenylenediamine, N,N'-bis(methylheptyl)-p-phenylenediamine, N,N'-bis(1,4dimethylpentyl)-p-phenylenediamine, N,N'-bis(1-ethyl-3-methylpentyl)-p-phenylenediamine, N-methylpentyl-N'-phenyl-pphenylenediamine, N-(dimethylbutyl)-N'-phenyl-p-phenylenediamine, N,N'-diallyl-p-phenylenediamine, hindered diallyl-pphenylenediamine, phenylhexyl-p-paraphenylenediamine, phenyloctyl-p-paraphenylenediamine, an N-alkyl-N'-phenyl-pphenylenediamine, an N-alkyl-N'-allyl-p-phenylenediamine, N(3-methacryloyloxy-2-hydroxypropyl)-N'-phenyl-p-phenylenediamine, and p-(p-toluenesulfonylamido)diphenylamine.

These phenylamines and phenylenediamines are used either individually or in combination of two or more thereof in a total amount of from 0.1 to 10 parts by weight, preferably from 0.5 to 7 parts by weight, per 100 parts by weight of the chlorosulfonated polyethylene polymer. If the amount of component (b) is less than 0.1 part by weight, sufficient ozone resistance cannot be obtained. Use of component (b) in an amount exceeding 10 parts by weight is disadvantageous from the viewpoint of economy.

The acid acceptor which can be used as component (c) generally includes oxides or hydroxides of alkaline earth metals. Specific examples of suitable acid acceptors are magnesium oxide, calcium oxide, calcium hydroxide, and lead oxide. Hydrotalcite which is a composite of a metal hydroxide and a metal carbonate is also employable as component (c).

The acid acceptor is used in an amount of from 1 to 30 parts by weight per 100 parts by weight of the chlorosulfonated polyethylene polymer. If the amount of the acid acceptor is less than 1 part by weight, the acid accepting effect is insufficient. Use of more than 30 parts by weight only results in obtaining a vulcanized product of high hardness.

The vulcanizing agent which can be used as component (d) includes diaminemaleimide compounds and thiuram compounds.

Specific examples of suitable diaminemaleimide compounds are N,N'-phenylenediaminemaleimide, N,N'-ethylenediaminemaleimide, and N,N'-propylenediaminemaleimide.

Specific examples of suitable thiuram compounds are dipentamethylenethiuram tetrasulfide (TRA), tetramethylthiuram disulfide (TMTD), and tetraethylthiuram disulfide (TETD).

These diaminemaleimide compounds and thiuram compounds can be used either individually or in combination thereof in an amount of from 0.1 to 10 parts by weight per 100 parts by weight of the chlorosulfonated polyethylene polymer. If the amount of the vulcanizing agent is less than 0.1 part by weight, the resulting vulcanized product has a low crosslinking density and a reduced tensile strength. If it exceeds 10 parts by weight, the composition has a reduced scorch time and encounters various problems on processing.

A combined use of the diaminemaleimide compound and the thiuram compound is advantageous for good balance between processing safety and crosSlinking density.

If desired, the composition of the present invention may further contain, in addition to the above-described essential components (a) to (d), fillers (e.g., carbon black, clay, silica, calcium carbonate), plasticizers (e.g., oils, esters, chlorinated paraffin), processing aids (e.g., lowmolecular weight polyethylene), antioxidants, and other various rubber compounding additives.

If desired, the composition may furthermore contain vulcanizing accelerators, such as a condensate of n-butylaldehyde and aniline, an amine compound (e.g., 6-ethoxy-2,2,4trimethyl-1,2-dihydroquinoiine), a dialkyldithiocarbamic acid metal salt (e.g., nickel dibutyldithiocarbamate), and an alcohol compound (e.g., pentaerythritol).

Vulcanization of the composition of the present invention can be carried out by known processes, such as steam vulcanization and press vulcanization, usually at a temperature of from 140° to 250° C. for a period of from 1 to 100 minutes.

A vulcanized product of the composition according to the present invention has excellent ozone resistance which has never been attained by the conventional techniques as well as excellent mechanical properties such as tensile strength and elongation. The ozone resistance of the vulcanized product does not undergo reduction even when immersed in grease or oils.

The above-described effects can first be obtained by using (a) an amine selected from phenylamines and phenylenediamines in combination with (b) an organic acid metal salt which has been regarded to cause reduction in scorch time and excluded from use, and using (c) an acid acceptor and (d) a vulcanizing agent selected from diaminemaleimide compounds and thiuram compounds. Use of only amines, e.g., 6-ethoxy-2,2,4trimethyl-1,2-dihydroquinoline, which have been generally employed as vulcanization accelerators for chlorosulfonated polyethylene polymers, cannot produce such effects. A lack of any one of the components (a), (b), (c), and (d) fails to obtain the above-described effects. This is a surprising fact unanticipated from the conventional techniques.

The composition of the present invention not only increases reliability on chlorosulfonated polyethylene polymers as a material of hoses, one of the conventional uses of chlorosulfonated polyethylene polymers, but is also promising for applications where ozone resistance is required, such as boots.

The present invention is now illustrated in greater detail with reference to Examples and Comparative Examples, but it should be understood that the present invention is not construed as being limited thereto. All the parts are by weight unless otherwise indicated.

Chemical and physical properties of the compositions prepared in Examples were measured according to the following test methods.

1) Scorch Time (Mooney Scorch/:
Measured according to JIS K6300 by means of a Mooney plastometer.

2) Tensile Characteristics:
Measured according to JIS K6301.
The abbreviations used in Table 1 as described later have the following meanings.
Hs: shore hardness
TB: tensile strength at break
EB: elongation at break
M100: 100% modulus 3) Ozone Resistance:
Dynamic ozone test was conducted by stretching a vulcanized product at an elongation of from 0 to 30% at 40° C. in an ozone concentration of 50 pphm in accordance with JIS K6301. The time required for development of ozone crack was measured.

EXAMPLE 1

A chlorosulfonated polyethylene polymer (CSM) ("TOSOCSM TS-530" produced by Tosoh Corporation), potassium stearate as an organic acid metal salt, N,N'-diphenyl-p-phenylenediamine ("Nocrac White" produced by Ouchi Shinko Chemical Industrial Co., Ltd.) as a phenylenediamine, magnesium oxide as an acid acceptor, N,N'-phenylenedimaleimide ("Vulnoc PM" produced by Ouchi Shinko Chemical Industrial Co., Ltd.) and dipentamethylenethiuram tetrasulfide ("Nocceler TRA" produced by Ouchi Shinko Chemical Industrial Co., Ltd.) as vulcanizing agents, and other additives were roll milled to obtain a compound having a composition shown in Table 1 below.

A scorch time of the resulting compound was determined.

The compound was subjected to press vulcanization or steam vulcanization at 150° C. for 30 minutes. Each of the resulting vulcanized products was subjected to tensile test.

Ozone resistance of the steam vulcanized product was measured. Then, the steam vulcanized product was immersed in fuel oil (Fuel D) at 40° C. for 48 hours and dried in air at room temperature, and ozone resistance was determined.

The results of these determinations are shown in Table 1.

EXAMPLE 2

The procedure of Example 1 was repeated, except for increasing the amounts of magnesium oxide and N,N'-diphenyl-pphenylenediamine (Nocrac White) to 10 parts and 5 parts, respectively, and replacing potassium stearate with sodium oleate. The results obtained are shown in Table 1.

EXAMPLE 3

The procedure of Example 1 was repeated, except for replacing potassium stearate with calcium stearate and replacing N,N'-diphenyl-p-phenylenediamine (Nocrac White) with another type of N,N'-diphenyl-p-phenylenediamine ("Nocrac DP" produced by Ouchi Shinko Chemical Industrial Co., Ltd.). The results obtained are shown in Table 1.

EXAMPLE 4

The procedure of Example 1 was repeated, except for excluding dipentamethylenethiuram tetrasulfide (Nocceler TRA), increasing the amount of Vulnoc PM, replacing N,N'-diphenyl-pphenylenediamine (Nocrac White) with phenyl-α-naphthylamine ("Nocrac PA" produced by Ouchi Shinko Chemical Industrial Co., Ltd.), and replacing potassium stearate with aluminum-stearate. The results obtained are shown in Table 1.

EXAMPLE 5

The procedure of Example 1 was repeated, except for decreasing the amount of N,N'-diphenyl-p-phenylenediamine (Nocrac White) to 1 part and replacing potassium stearate with lead naphtenate. The results obtained are shown in Table 1.

It can be seen from the results of Table 1 that each of the compositions of Examples 1 to 5 has excellent tensile characteristics and undergoes a little reduction in physical properties on steam vulcanization. Besides, the compositions exhibit unanticipatedly improved ozone resistance as requiring 1000 hours or more before development of ozone crack, and such high ozone resistance undergoes substantially no change after immersion in fuel oil.

COMPARATIVE EXAMPLE 1

The procedure of Example 1 was repeated, except for using no N,N'-diphenyl-p-phenylenediamine (Nocrac White). The results obtained are shown in Table 1.

It can be seen from Table 1 that ozone resistance is considerably deteriorated unless a phenylenediamine, an essential component of the present invention, is present.

COMPARATIVE EXAMPLE 2

The procedure of Example 1 was repeated, except for using no organic acid metal salt. The results obtained are shown in Table 1.

The results reveal that ozone resistance cannot be improved without an organic acid metal salt, an essential component of the present invention.

COMPARATIVE EXAMPLE 3

The procedure of Example 1 was repeated, except for using neither N,N'-diphenyl-p-phenylenediamine (Nocrac White) nor potassium stearate and using pentaerythritol as a vulcanization accelerator. The results obtained are shown in Table 1.

It is apparent that the composition is inferior in ozone resistance to those of the foregoing Examples.

COMPARATIVE EXAMPLE 4

The procedure of Example 1 was repeated, except for using neither diphenylamine nor p-phenylenediamine and no organic acid metal salt but using nickel dibutyldithiocarbamate ("Nocrac NBC" produced by Ouchi Shinko Chemical Industrial Co., Ltd.) as a vulcanization accelerator. The results obtained are shown in plasticizer with rape seed oil as a vegetable oil. The results obtained are shown in Table 1.

It can be seen from the results of Table 1, ozone resistance can be improved by addition of rape seed oil but returns to the original level on immersion in fuel oil. It thus turned out that such a composition is unsuitable for use in articles which are brought into contact with oils.

TABLE 1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Composition (part): |  |  |  |  |  |  |  |  |  |  |
| CSM | 100 | 100 | 100 | 100 | 100 | 100 | 100 | 100 | 100 | 100 |
| Magnesium oxide | 5 | 10 | 5 | 5 | 5 | 5 | 5 | 5 | 5 | 5 |
| AC Polyethylene 617A[1)] | 2 | 2 | 2 | 2 | 2 | 2 | 2 | 2 | 2 | 2 |
| Suntight[2)] | 2 | 2 | 2 | 2 | 2 | 2 | 2 | 2 | 2 | 2 |
| SRF carbon black | 55 | 55 | 55 | 55 | 55 | 55 | 55 | 55 | 55 | 55 |
| Dioctyl sebacate | 15 | 15 | 15 | 15 | 15 | 15 | 15 | 15 | 15 | — |
| Rape seed oil | — | — | — | — | — | — | — | — | — | 15 |
| Potassium stearate | 2 | — | — | — | — | 2 | — | — | — | — |
| Sodium oleate | — | 2 | — | — | — | — | — | — | — | — |
| Calcium stearate | — | — | 5 | — | — | — | — | — | — | — |
| Aluminum stearate | — | — | — | 5 | — | — | — | — | — | — |
| Lead naphthenate | — | — | — | — | 10 | — | — | — | — | — |
| Nocrac White[3)] | 3 | 5 | — | — | 1 | — | 3 | — | — | — |
| Nocrac DP[4)] | — | — | 7 | — | — | — | — | — | — | — |
| Nocrac PA[5)] | — | — | — | 7 | — | — | — | — | — | — |
| Vulnoc PM[6)] | 3 | 3 | 3 | 3 | 3 | 3 | 3 | 3 | 3 | 3 |
| Nocceler TRA[7)] | 2 | 2 | 2 | 2 | 2 | 2 | 2 | 2 | 2 | 2 |
| Nocrac NBC[8)] | — | — | — | — | — | — | — | — | 3 | 3 |
| Pentaerythritol | — | — | — | — | — | — | — | 3 | 3 | 3 |
| Scorch time (ML1+, 125° C.): |  |  |  |  |  |  |  |  |  |  |
| Vm | 53 | 46 | 40 | 39 | 43 | 41 | 40 | 40 | 40 | 42 |
| t5 (min) | 7.4 | 5.5 | 10.5 | 10.0 | 8.6 | 12.6 | >60 | 25.0 | 10.0 | 11.5 |
| Tensile Characteristics: |  |  |  |  |  |  |  |  |  |  |
| Vulcanization Conditions | 150° C. 30 min | 150° C. 30 min | 150° C. 30 min | 150° C. 30 min | 150° C. 30 min | 150° C. 30 min | 160° C. 40 min | 160° C. 30 min | 150° C. 30 min | 150° C. 30 min |
| Press Vulcanization: |  |  |  |  |  |  |  |  |  |  |
| Hs (JIS-A) | 72 | 72 | 73 | 72 | 71 | 69 | 69 | 71 | 71 | 68 |
| TB (kg/cm$^2$) | 246 | 230 | 242 | 245 | 237 | 251 | 225 | 234 | 235 | 221 |
| EB (%) | 270 | 260 | 250 | 260 | 270 | 270 | 280 | 260 | 260 | 260 |
| M100 (kg/cm$^2$) | 78 | 72 | 70 | 70 | 70 | 63 | 51 | 62 | 75 | 71 |
| Steam Vulcanization: |  |  |  |  |  |  |  |  |  |  |
| Hs (JIS-A) | 67 | 67 | 68 | 66 | 67 | 67 | 66 | 67 | 69 | 67 |
| TB (kg/cm$^2$) | 232 | 225 | 228 | 231 | 230 | 233 | 209 | 213 | 225 | 215 |
| EB (%) | 290 | 260 | 240 | 240 | 250 | 270 | 300 | 280 | 250 | 250 |
| M100 (kg/cm$^2$) | 64 | 62 | 60 | 58 | 60 | 60 | 45 | 55 | 72 | 68 |
| Ozone Resistance of Steam-Vulcanized Product: |  |  |  |  |  |  |  |  |  |  |
| Original (hr) | >1000 | >1000 | >1000 | 830 | 850 | 420 | 320 | 300 | 350 | 550 |
| After Immersion in Fuel Oil (hr) | >1000 | >1000 | >1000 | 900 | 800 | 400 | 330 | 350 | 380 | 360 |

Note:
[1)]Low-molecular weight polyethylene made by Allied Chemical Corporation
[2)]Special wax made by Seiko Kagaku K.K., which functions as a surface crack-preventing agent
[3)]N,N'-Dinaphthyl-p-phenylenediamine
[4)]N,N'-Diphenyl-p-phenylenediamine
[5)]Phenyl-α-naphthylamine
[6)]N,N'-Phenylenedimaleimide
[7)]Dipentamethylenethiuram disulfide
[8)]Nickel Dibutyldithiocarbamate Table 1.

The compound is the one regarded to have particularly excellent ozone resistance out of the so-far proposed chlorosulfonated polyethylene compositions, but it turned out still inferior in ozone resistance to the compositions of the present invention.

COMPARATIVE EXAMPLE 5

The procedure of Comparative Example 4 was repeated, except for replacing dioctyl sebacate used as a While the invention has been described in detail and with reference to specific embodiments thereof, it will be apparent to one skilled in the art that various changes and modifications can be made therein without departing from the spirit and scope thereof.

What is claimed is:

1. A chlorosulfonated polyethylene polymer composition comprising a chlorosulfonated polyethylene polymer and the following components (a) to (d), (a) from 0.1 to 20 parts by weight of a metal salt of an organic acid, (b) from 0.1 to 10 parts by weight of a phenylamine, phenylenediamine, or phenylamine and phenylenediamine, (c) from 1 to 30 parts by weight of an acid acceptor, and (d) from 0.1 to 10 parts by weight of a vulcanizing agent, per 100 parts by weight of the chlorosulfonated polyethylene polymer.

2. A chlorosulfonated polyethylene polymer composition as claimed in claim 1, wherein said metal salt of an organic acid is a metal salt of a saturated or unsaturated fatty acid having 6 or more carbon atoms, a chain organic acid having less than 6 carbon atoms, an aromatic organic acid, or a cyclic organic acid.

3. A chlorosulfonated polyethylene polymer composition as claimed in claim 1, wherein said metal salt of an organic acid is present in an amount of from 0.3 to 10 parts by weight per 100 parts by weight of the chlorosulfonated polyethylene polymer.

4. A chlorosulfonated polyethylene polymer composition as claimed in claim 1, wherein said component (b) is present in an amount of from 0.5 to 7 parts by weight per 100 parts by weight of the chlorosulfonated polyethylene polymer.

5. A chlorosulfonated polyethylene polymer composition as claimed in claim 1, wherein said vulcanizing agent is selected from diaminemaleimide compounds and thiuram compounds.

* * * * *